United States Patent Office 2,968,156
Patented Jan. 17, 1961

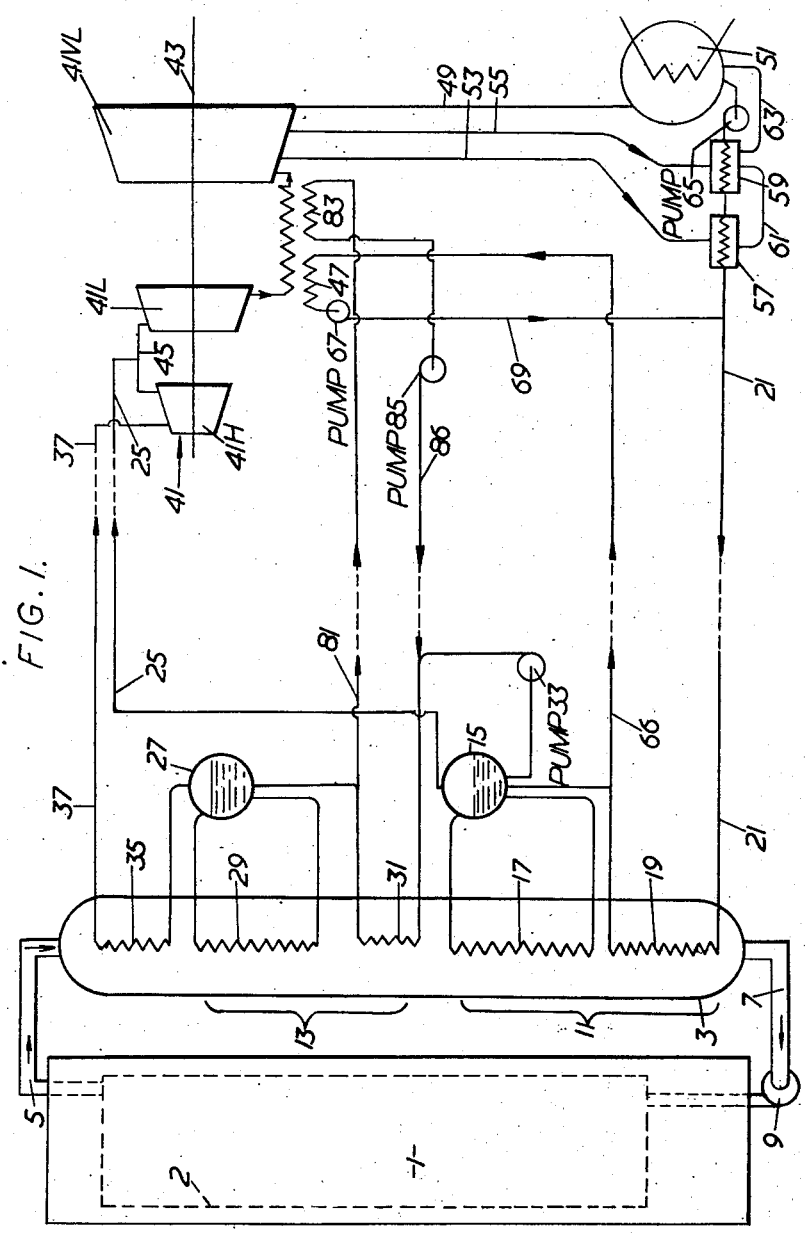

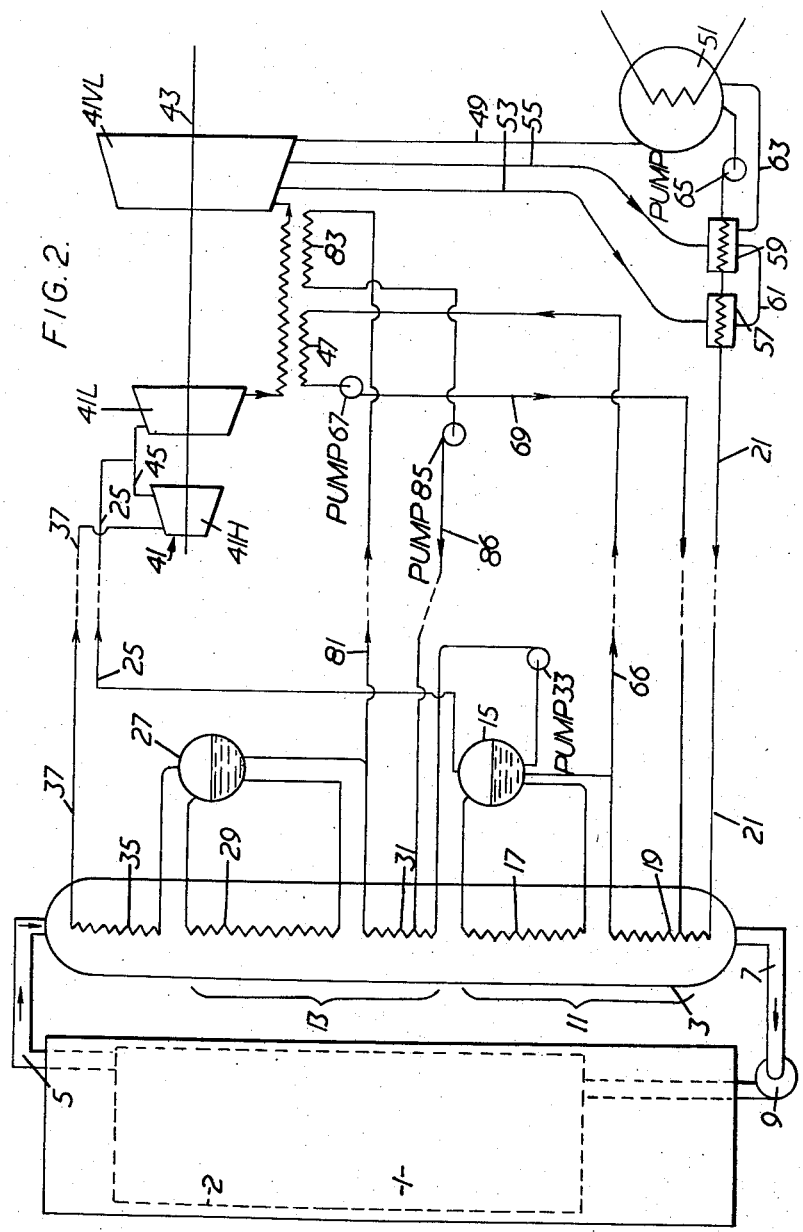

2,968,156
POWER PLANT

Pierre Henri Pacault and Jean Frederic Tillequin, Paris, France, assignors to Babcock & Wilcox Limited, London, England, a British company Filed Mar. 6, 1958, Ser. No. 719,551

Claims priority, application France Mar. 8, 1957

3 Claims. (Cl. 60—73)

This invention relates to power plant comprising elastic fluid engine means including a plurality of pressure stages and a heat exchanger arranged to be heated by a fluid heat carrier carrying heat released in a nuclear reactor and adapted to produce elastic fluid for the engine means by evaporation of a liquid.

In practical nuclear reactors of today the temperature of the coolant utilised to remove heat from the reactor is relatively low, and as a result it is difficult to obtain a sufficiently high degree of superheat in the elastic fluid supplied to the engine means for that fluid to remain dry or substantially dry during expansion in the engine means.

It would be an advantage if elastic fluid could be reheated between different pressure stages of the engine means, particularly before the lower or lowest pressure stage of the engine means. Such reheating is rendered difficult in such a power plant, utilising steam as the elastic fluid and with steam turbines as the engine means, partly because it is necessary to install the steam turbines some distance from the heat exchanger, often in a separate building, for reasons of biological protection, and partly because in view of the low temperatures available the steam generating plant must operate at low steam pressures involving large steam volumes and leading to the requirement of very large diameter steam mains. Thus in applying the principle of reheating of motive fluid to the case of a power plant incorporating heat exchangers heated by the heated coolant of a nuclear reactor, one is faced with the problem that while it is most undesirable to take the heated coolant to the vicinity of the engine means for biological reasons, very large mains are required to take the partly expanded motive fluid to the remote heat exchanger heated by the coolant.

The present invention is directed to the provision of improved power plant comprising elastic fluid engine means including a plurality of pressure stages, a heat exchanger arranged to be heated by a fluid heat carrier carrying heat released in a nuclear reactor and adapted to produce elastic fluid for the engine means by evaporation of a liquid.

Further objects and advantages of the invention will be apparent from the subsequent description of the invention.

The invention will now be described, by way of example, with reference to the accompanying diagrammatic drawings, in which:

Figure 1 is a diagram of power plant including a steam turbine and an associated nuclear reactor which serves as the source of heat for the generation of the steam; and Figure 2 is a diagram of an alternative form of such power plant.

Referring to the embodiment of the invention shown in Figure 1, a gas cooled nuclear reactor 1, suitably of the graphite-moderated, natural uranium type having a core containment vessel 2 connected to an adjacent, vertically extending cylindrical pressure vessel 3, an outlet duct 5 connecting the upper part of the containment vessel 2 with the upper end of the vessel 3 and an inlet duct 7 connecting the lower end of the vessel 3 through a fan 9 to the lower part of the containment vessel. The ducts 5 and 7 are made as short as practicable in order to reduce the power needed to drive the fan 9.

The pressure vessel 3 contains the heating surfaces of a tubulous steam generating unit comprising a low pressure section indicated generally by 11 and a high pressure section indicated generally by 13. Low pressure section 11 includes a steam and water drum 15, a steam generating heat exchanger 17 having its lower end and its upper end connected respectively to the water space and to the steam space of the drum and an economiser 19 having its lower end connected to a feedwater pipe 21 and its upper end connected to the water space of the drum. The steam space of the drum is connected to a low pressure steam main 25. High pressure section 13 includes a steam and water drum 27, a steam generating heat exchanger 29 having its lower end and its upper end connected respectively to the water space and to the steam space of the drum, an economiser 31 having its lower end connected through a feedwater pump 33 for this section to the water space of the drum 15 and its upper end connected to the water space of the drum 27, and a superheater 35 having its lower end connected to the steam space of the drum 27 and its upper end connected to a high pressure steam main 37.

The steam generating unit supplies steam as motive fluid to engine means which comprise a turbine unit 41 having a high pressure stage 41H, low pressure stage 41L, and a very low pressure stage 41VL, the rotors of the three stages being connected in the usual manner to a common output shaft 43. The high pressure steam main 37 is connected to the inlet port of the high pressure stage 41H, the low pressure steam main 25 is connected to the inlet port of the low pressure stage 41L and a pipe 45 connects the outlet port of the high pressure stage to the inlet port of the low pressure stage. The outlet port of the low pressure stage 41L is connected through first one of the flow paths of a heat exchanger 47 of a tubulous indirect heat exchange type and then one of the flow paths of a similar heat exchanger 83 to the inlet port of the very low pressure stage 41VL. The outlet port of the very low pressure stage 41VL is connected by ducting indicated at 49 to a steam condenser 51 of conventional type, and two steam bleed pipes indicated by 53 and 55 respectively are connected to the very low pressure stage so as to permit the bleeding of steam from this stage. Pipe 53 serves to conduct bled steam to a feedwater heater 57 of the indirect type; pipe 55 serves to conduct bled steam to a second feedwater heater 59 of the indirect type; cooled bled steam from the heater 57 is fed through a pipe 61 to the heater 59, where it gives up further heat, and all the cooled bled steam is led from the heater 59 through a pipe 63 to the steam condenser 51. Condensate from the condenser 51 is fed by a pump 65 through the feedwater heaters 59 and 57 to the feedwater pipe 21.

The upper end of the economiser 19 of the low pressure steam generating section 11 is connected by a pipe 66 to the inlet end of the second flow path of the indirect heat exchanger 47, and a pump 67 is arranged to extract water fed to the heat exchanger 47 through the pipe 66 and discharge it through a pipe 69 into the feedwater pipe 21.

The upper end of the economiser 31 of the high pressure steam generating section 13 is connected by a pipe 81 to the inlet end of the second flow path of the indirect heat exchanger 83, and a pump 85 is arranged to extract water fed to the heat exchanger 83 through the pipe 81 and discharge it through a pipe 86 into the lower end of economiser 31.

In use of the power plant shown in Figure 1, heated coolant gas from the nuclear reactor 1 is caused to circulate by the fan 9, extracting heat from the reactor core and giving up heat to the heat exchangers located in the pressure vessel 3.

Feedwater fed through the pipe 21 is heated in economiser 19 of the low pressure section 11 of the steam generating unit, and some of this water is discharged into the drum 15. Hot water from the drum 15 circulates through the steam generating heat exchanger 17, the steam-water mixture discharged from this heat exchanger being separated into steam and water in the drum. Steam from the drum 15 passes into the low pressure steam main 25.

The high pressure section 13 of the steam generating unit is supplied with heated feedwater by the pump 33 from the water space of the drum 15 of the low pressure section. This feedwater is heated by the coolant in the economiser 31 and is fed into the drum 27, from which water circulates through the steam generating heat exchanger 29, the steam-water mixture discharged from this heat exchanger being separated into steam and water in the drum. Steam from the drum 27 passes through the superheater 35 into the high pressure steam main 37.

Water from the outlet end of the low pressure economiser 19 is drawn through the pipe 66 and the second flow path of the indirect heat exchanger 47 by the pump 67 and is returned by the pipe 69 to the feedwater pipe 21.

Water from the outlet end of the high pressure economiser 31 is drawn through the pipe 81 and the second flow path of the indirect heat exchanger 83 by the pump 85 and is returned by the pipe 86 to the inlet of the high pressure economiser 31.

The high pressure stage 41H of the turbine receives superheated steam under the high pressure of steam generating section 13 through the steam main 37, expands that steam and discharges it through the pipe 45 into the low pressure stage 41L. The degree of expansion in the stage 41H is such that steam so discharged tends to be at somewhat lower than pressure steam main 25, so that the low pressure stage also receives steam generated in the low pressure steam generating section 11. Steam exhausted from the low pressure stage 41L passes through the first flow path in the indirect heat exchanger 47, in which it receives heat from the hot water circulated by the pump 67, then through the first flow path in the indirect heat exchanger 83, in which it receives heat from the hot water circulated by the pump 85, and passes to the very low pressure stage 41VL, from which it is exhausted to the condenser 51 with the exception of steam bled off through the pipes 53 and 55 and utilised for feedwater preheating. Condensate from the condenser 51 is fed by the pump 65 through the two feedwater preheaters 59 and 57 into the feedwater pipe 21.

The coolant from the nuclear reactor 1 gives up heat at a relatively low temperature to water in the economiser 19, and some of this low grade heat is utilised to reheat the steam passing to the very low pressure stage of the steam turbine. In this way the desired heating of the steam is obtained without serious degradation of heat, that is to say the use of a high temperature heat source to heat a fluid or body of relatively low temperature, and this improves the efficiency of the heat cycle.

The steam is further reheated in heat exchanger 83 by water which, having been heated in the high pressure economiser 31 by hotter coolant than is the case for water heated in the economiser 19, is of higher temperature than the water passing through the heat exchanger 47. It has been found that by the addition of this further resuperheating of steam passing from the low pressure stage 41L to the very low pressure stage 41VL an increase in the thermo-dynamic efficiency of the power plant of the order of 1 to 2 percent can be obtained, in addition to the improvement in efficiency given by the reheating with water from the economiser 19.

It has been found possible utilising reheat in the manner described above to operate the very low pressure turbine stage with a dryness fraction of the order of 0.90 to 0.95 in the exhaust steam discharged from that turbine stage to the condenser.

Since the specific heat of steam is less than that of water, and since the density of water is greater than that of steam, the mass flow and the volumetric flow of water along the pipe 65 are much less than would be necessary for steam if the steam to be reheated were conducted to the pressure vessel 3. The arrangement thus gives a considerable economy in first cost since similar mains may be used, while during use the power consumed by the pump 67 is small compared with the power which would be wasted by fluid friction if the steam were returned for reheating.

In the arrangement described, the pipe 69 connects with the feedwater pipe 21. Where the water flowing along the pipe 69 is considerably hotter than the water in the pipe 21, it is advantageous from the thermo-dynamic point of view to connect the pipe 69 not to the pipe 21, but directly into an intermediate point of the economiser 19. Degradation of heat in the water in pipe 69 is then avoided or reduced, while the coolant passing to the duct 7 from the pressure vessel 3 is finally cooled by water having the lowest available temperature, i.e. that of water in the pipe 21. It will be appreciated that the colder the coolant leaving the pressure vessel the lower the power consumption in the fan 9.

Figure 2 illustrates a modification in which the water returned from the reheaters 47 and 83 is fed to intermediate points in the economisers 19 and 31 respectively.

It is found that when low grade heat is extracted by an economiser such as the economiser 19 and is used for reheating of low pressure steam, it is possible to operate the low pressure section 11 of the steam generating unit at a somewhat higher pressure without any increase in the temperature of the coolant at the exit from the pressure vessel 3. The combination of this higher pressure and the use of reheat is found to give a gain of thermal efficiency in the heat cycle of the order of five percent. A subsidiary advantage is that the use of a higher pressure in the low pressure section 11 enables the use of a smaller and cheaper low pressure main 25.

The invention is not limited to nuclear power stations having gas-cooled reactors and is not limited to the heating of very low pressure steam passing to a very low pressure turbine, although it finds particular application in such power stations utilising such turbines. For example, in the case of sodium and water cooled reactors the use of the invention makes it possible to effect reheating whilst avoiding the necessity of conveying highly radio-active substances, or steam, appreciable distances, and in the case of a liquid metal such as sodium, it makes it possible to avoid the use of expensive heating means intended to ensure that the liquid metal shall not freeze in the conveying pipes extending between the pressure vessel and the vicinity of the engine means.

What is claimed is:
1. Power plant comprising elastic fluid engine means including a higher pressure stage and a lower pressure stage, duct means connected to the expanded fluid outlet from the higher pressure stage and to the inlet of the lower pressure stage, a first elastic-fluid indirect reheater disposed in that duct means, a second elastic-fluid indirect reheater disposed in that duct means between the first reheater and the lower pressure stage, second duct means for the flow of a fluid heat carrier, first vapour generating means disposed in the second duct means, a vapour outlet from this vapour generating means connected to the engine means, first economiser means disposed in the second duct means, a hot liquid outlet from this economiser means connected to the first vapour generating means, second vapour generating means disposed in the second duct means and operating at a higher pressure than the first vapour generating means, a vapour outlet from the second vapour generating means connected to the engine means, second economiser means disposed in the second duct means and operating at a higher pressure than the first economiser means, a hot liquid outlet from this economiser means connected to the second vapour generating means, first pipe means connecting the outlet of the first economiser means to the first reheater and second pipe means connecting the outlet of the second economiser means to the second reheater.

2. Power plant as claimed in claim 1, in which the first pipe means connects part only of the first economiser means in series with the first reheater, circulating pump means are disposed in this pipe means, the second pipe means connects part only of the second economiser means in series with the second reheater, and circulating pump means are disposed in this pipe means.

3. Power plant as claimed in claim 1, in which the first vapour generating means includes liquid-vapour separating means, the liquid outlet from these separating means is connected by pipe means to the inlet of the second economiser means, and a pump is disposed in these pipe means, whereby the higher pressure second economiser means receive their liquid from the separating means.

References Cited in the file of this patent

UNITED STATES PATENTS

| 1,745,964 | Unde | Feb. 4, 1930 |

FOREIGN PATENTS

| 954,715 | France | June 13, 1949 |
| 463,075 | Great Britain | Mar. 22, 1937 |
| 757,293 | Great Britain | Sept. 19, 1956 |